United States Patent [19]
Lanfranchi

[11] Patent Number: 5,669,328
[45] Date of Patent: Sep. 23, 1997

[54] AUTOMATIC ANIMAL FEEDING SYSTEM

[76] Inventor: Tammy Lanfranchi, 32 Ferman Dr., Guelph, Ontario, Canada, N1H 7E1

[21] Appl. No.: 663,785

[22] Filed: Jun. 14, 1996

[51] Int. Cl.$^6$ .................................................. A01K 5/02
[52] U.S. Cl. ................................ 119/57.92; 119/51.12
[58] Field of Search ........................ 119/57.92, 51.02, 119/61, 62, 51.12

[56] References Cited

U.S. PATENT DOCUMENTS

| | | |
|---|---|---|
| 2,528,742 | 11/1950 | Coffing ............................ 119/51.12 |
| 3,468,291 | 9/1969 | Allen ............................... 119/51.12 |
| 3,826,231 | 7/1974 | Crawford et al. ................ 119/51.12 |
| 4,036,178 | 7/1977 | Lee et al. ........................ 119/51.02 |
| 4,248,175 | 2/1981 | Navarro ........................... 119/51.12 |
| 4,617,874 | 10/1986 | Zammarano ................... 119/51.12 |
| 5,150,664 | 9/1992 | Kirk ................................. 119/51.12 |
| 5,377,620 | 1/1995 | Phillippi .......................... 119/51.12 |
| 5,570,655 | 11/1996 | Targa .............................. 119/51.02 |

*Primary Examiner*—Robert P. Swiatek
*Assistant Examiner*—Yvonne R. Abbott

[57] ABSTRACT

A new automatic animal feeding system for automatically providing an animal with specific diet requirements an specific supply of food by preventing other animals from gaining access to the food which is intended for the animal with the specific diet requirement. The present invention allows the specified animal access to the food whenever the animal comes within a predetermined distance of the present invention. The inventive device includes a base member, a conical-shaped protective cover rotatably engaging the base member, a rotating means which rotates the conical-shaped protective cover, a feeding dish within the conical-shaped protective cover, and a power source electronically connected to the rotating means.

6 Claims, 3 Drawing Sheets

AUTOMATIC ANIMAL FEEDING SYSTEM

BACKGROUND OF THE INVENTION

1. Field of the Invention

The present invention relates to Animal Feeding Devices and more particularly pertains to a new Automatic Animal Feeding System for automatically providing an animal with specific diet requirements an specific supply of food by preventing other animals from gaining access to the food which is intended for the animal with the specific diet requirement. The present invention allows the specified animal access to the food whenever the animal comes within a predetermined distance of the present invention.

2. Description of the Prior Art

The use of Animal Feeding Devices is known in the prior art. More specifically, Animal Feeding Devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art Animal Feeding Devices include U.S. Pat. Nos. 4,029,051; 5,222,461; 4,463,706; 5,320,067; 4,655,170 and 4,162,683.

While these devices fulfill their respective, particular objectives and requirements, the aforementioned patents do not disclose a new Automatic Animal Feeding System. The inventive device includes a base member, a conical-shaped protective cover rotatably engaging the base member, a rotating means which rotates the conical-shaped protective cover, a feeding dish within the conical-shaped protective cover, and a power source electronically connected to the rotating means.

In these respects, the Automatic Animal Feeding System according to the present invention substantially departs from the conventional concepts and designs of the prior art, and in so doing provides an apparatus primarily developed for the purpose of automatically providing an animal with specific diet requirements an specific supply of food by preventing other animals from gaining access to the food which is intended for the animal with the specific diet requirement. The present invention allows the specified animal access to the food whenever the animal comes within a predetermined distance of the present invention.

SUMMARY OF THE INVENTION

In view of the foregoing disadvantages inherent in the known types of Animal Feeding Devices now present in the prior art, the present invention provides a new Automatic Animal Feeding System construction wherein the same can be utilized for automatically providing an animal with specific diet requirements an specific supply of food by preventing other animals from gaining access to the food which is intended for the animal with the specific diet requirement. The present invention allows the specified animal access to the food whenever the animal comes within a predetermined distance of the present invention.

The general purpose of the present invention, which will be described subsequently in greater detail, is to provide a new Automatic Animal Feeding System apparatus and method which has many of the advantages of the Animal Feeding Devices mentioned heretofore and many novel features that result in a new Automatic Animal Feeding System which is not anticipated, rendered obvious, suggested, or even implied by any of the prior art Animal Feeding Devices, either alone or in any combination thereof.

To attain this, the present invention generally comprises a base member, a conical-shaped protective cover rotatably engaging the base member, a rotating means which rotates the conical-shaped protective cover, a feeding dish within the conical-shaped protective cover, and a power source electronically connected to the rotating means.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Automatic Animal Feeding System apparatus and method which has many of the advantages of the Animal Feeding Devices mentioned heretofore and many novel features that result in a new Automatic Animal Feeding System which is not anticipated, rendered obvious, suggested, or even implied by any of the prior art Animal Feeding Devices, either alone or in any combination thereof.

It is another object of the present invention to provide a new Automatic Animal Feeding System which may be easily and efficiently manufactured and marketed.

It is a further object of the present invention to provide a new Automatic Animal Feeding System which is of a durable and reliable construction.

An even further object of the present invention is to provide a new Automatic Animal Feeding System which is susceptible of a low cost of manufacture with regard to both materials and labor, and which accordingly is then susceptible of low prices of sale to the consuming public, thereby making such Automatic Animal Feeding System economically available to the buying public.

Still yet another object of the present invention is to provide a new Automatic Animal Feeding System which provides in the apparatuses and methods of the prior art some of the advantages thereof, while simultaneously overcoming some of the disadvantages normally associated therewith.

Still another object of the present invention is to provide a new Automatic Animal Feeding System for automatically providing an animal with specific diet requirements an specific supply of food by preventing other animals from gaining access to the food which is intended for the animal with the specific diet requirement. The present invention allows the specified animal access to the food whenever the animal comes within a predetermined distance of the present invention.

Yet another object of the present invention is to provide a new Automatic Animal Feeding System which includes a base member, a conical-shaped protective cover rotatably engaging the base member, a rotating means which rotates the conical-shaped protective cover, a feeding dish within the conical-shaped protective cover, and a power source electronically connected to the rotating means.

Still yet another object of the present invention is to provide a new Automatic Animal Feeding System that allows the user to specifically give a certain amount and type of food to a pet without other animals consuming said food.

Even still another object of the present invention is to provide a new Automatic Animal Feeding System that protects the food from contamination from water or other debris Still another object of the present invention is to provide an automatic feeding system which automatically allows a specified animal to open the conical-shaped protective cover giving said animal access to the food.

A Further objective of the present invention is to provide an animal with his food while keeping children away and out of the specified food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
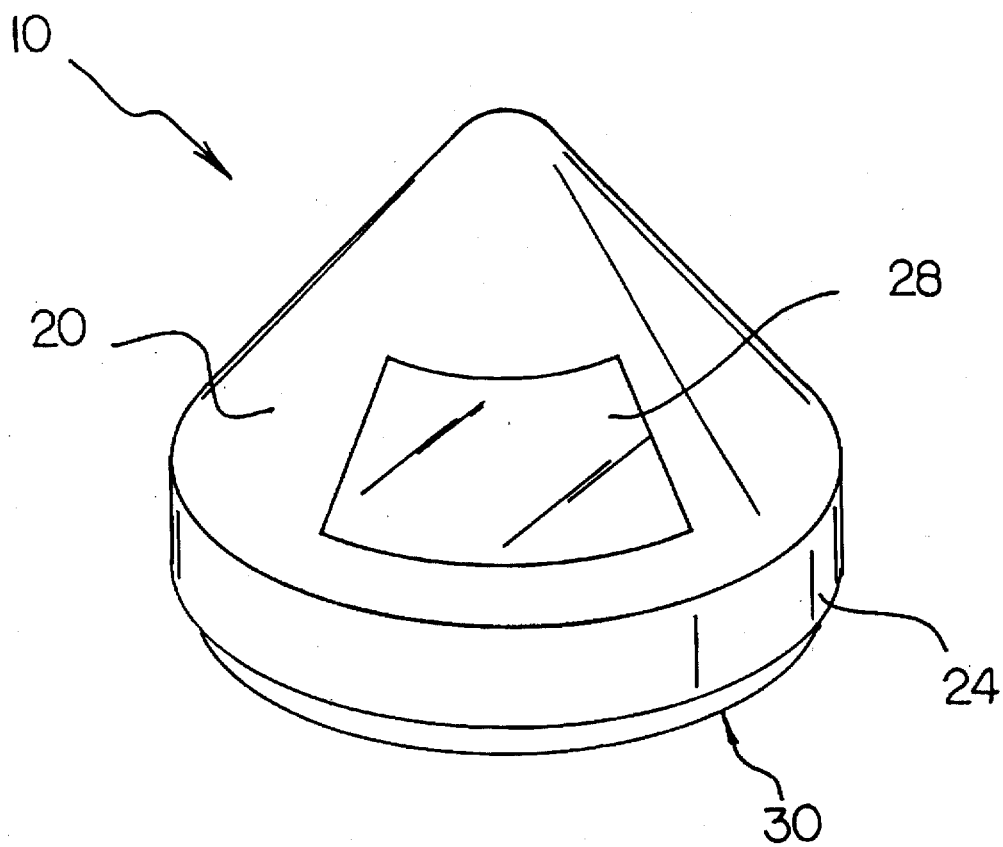
FIG. 1 is an upper side perspective view of a new Automatic Animal Feeding System in the closed position according to the present invention.

With reference now to the drawings, and in particular to FIGS. 1 through 6 thereof, a new Automatic Animal Feeding System embodying the principles and concepts of the present invention and generally designated by the reference numeral 10 will be described.

More specifically, it will be noted that the Automatic Animal Feeding System 10 comprises a base member 30, a conical-shaped protective cover 20 rotatably secured to the top of the base member 30, a feeding dish 50 removably resting on the base member 30, a rotating means 40 secured to the base member 30 and mechanically engaging the conical-shaped protective cover 20 where the rotating means 40 protected by a water proof cover 49, and a power source 60 electronically connected to the rotating means 40.

Figure 2:
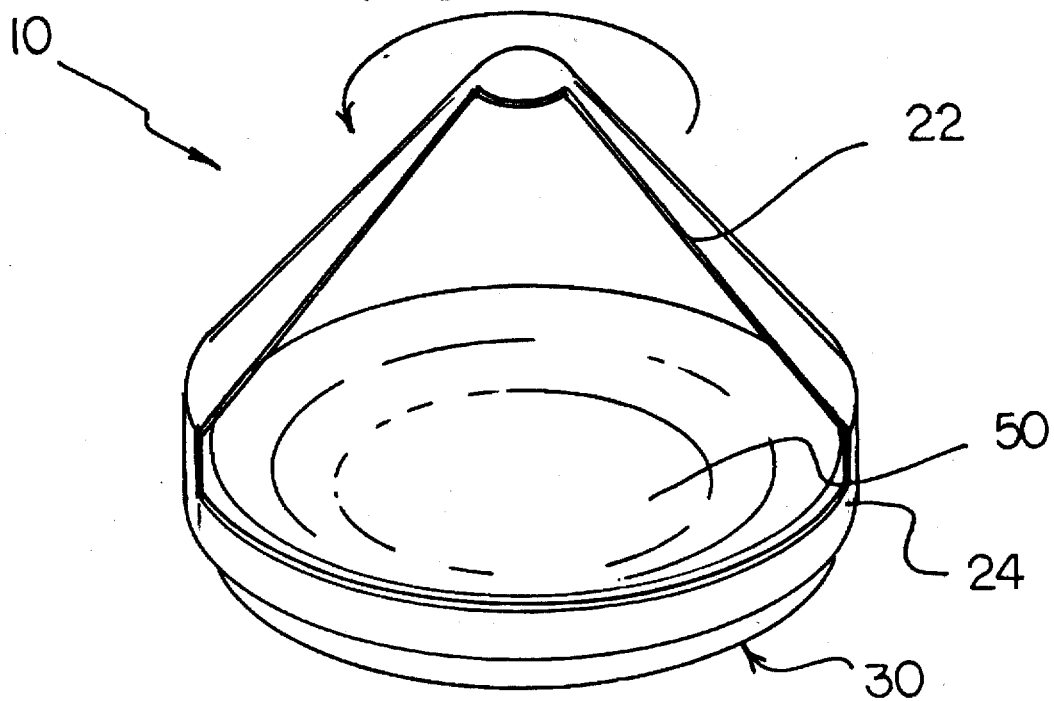
FIG. 2 is an upper side perspective view disclosing the present invention in the open position allowing the pet access to the food within.
Figure 3:
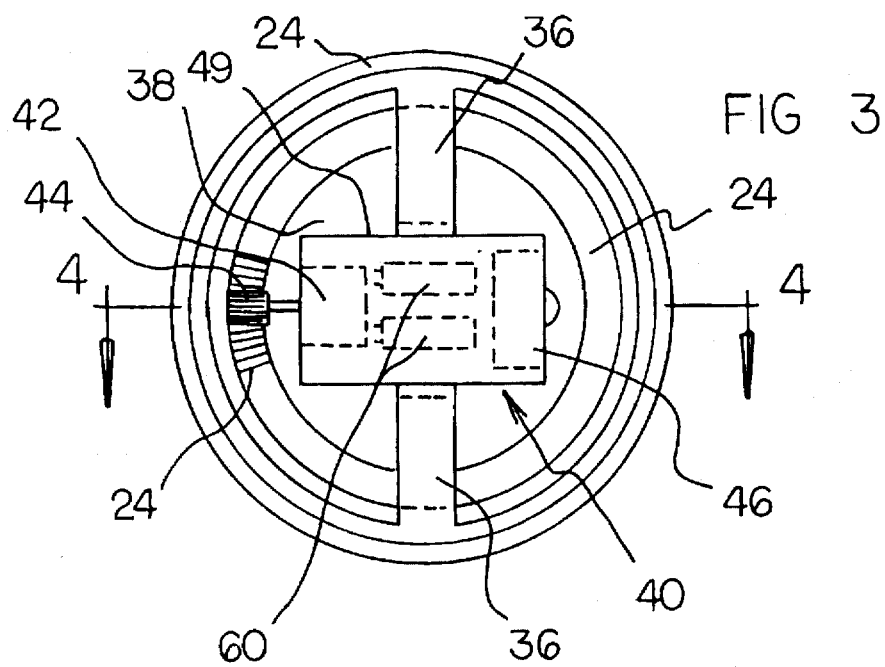
FIG. 3 is a bottom view of the present invention disclosing the rotating means in cooperation with the base member and the conical-shaped protective cover.
Figure 4:
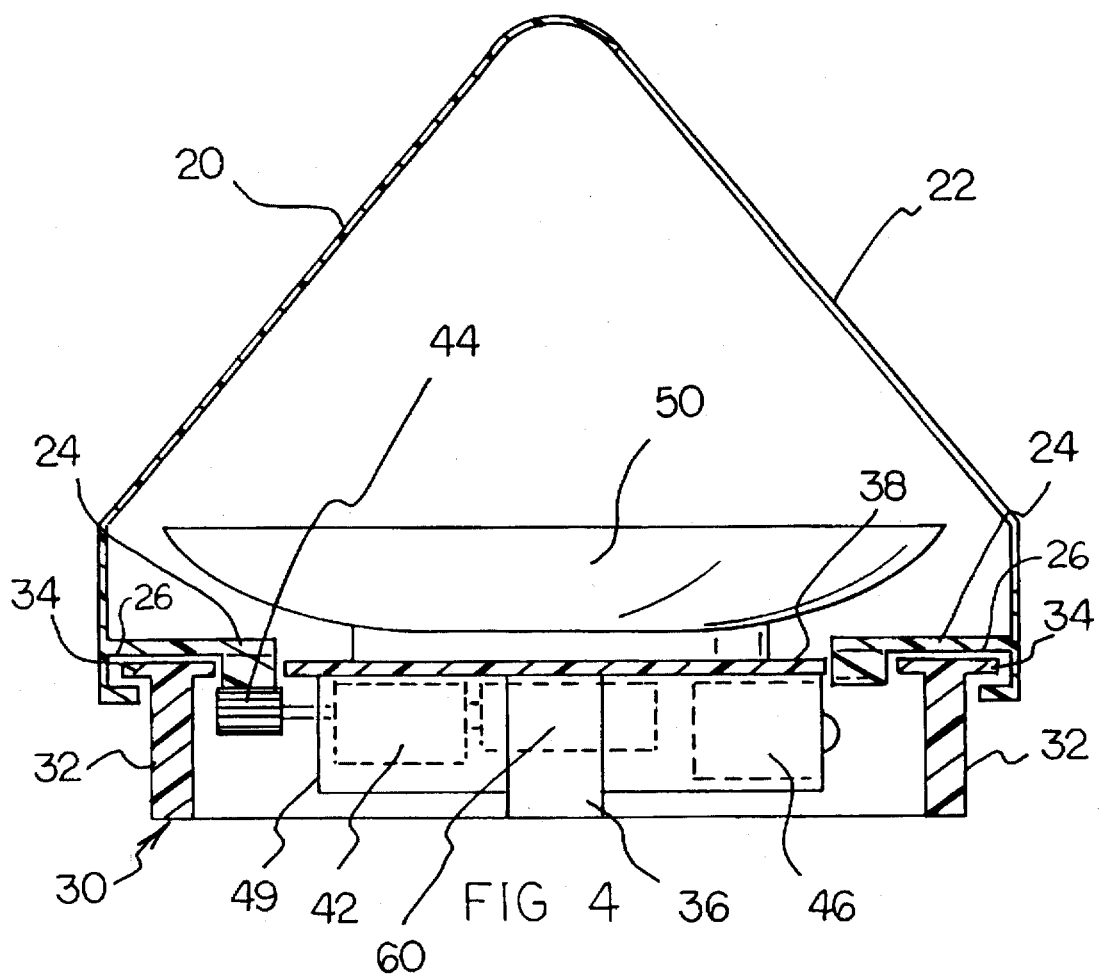
FIG. 4 is a cross sectional view taken along line 4—4 of FIG. 3 disclosing the circular vertical bracket in cooperation with the rabbet of the geared ring member and further disclosing the driver gear engaging the geared ring member.
Figure 5:
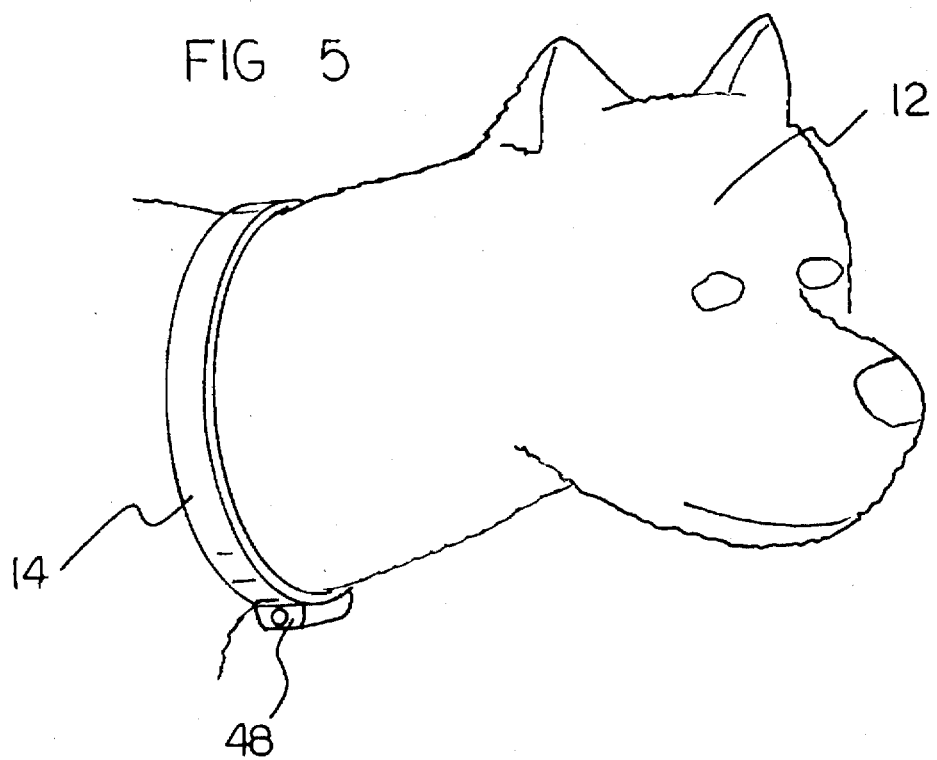
FIG. 5 is a upper side perspective view of the transmitter secured to a collar where the collar is attached to the neck of an animal.
Figure 6:
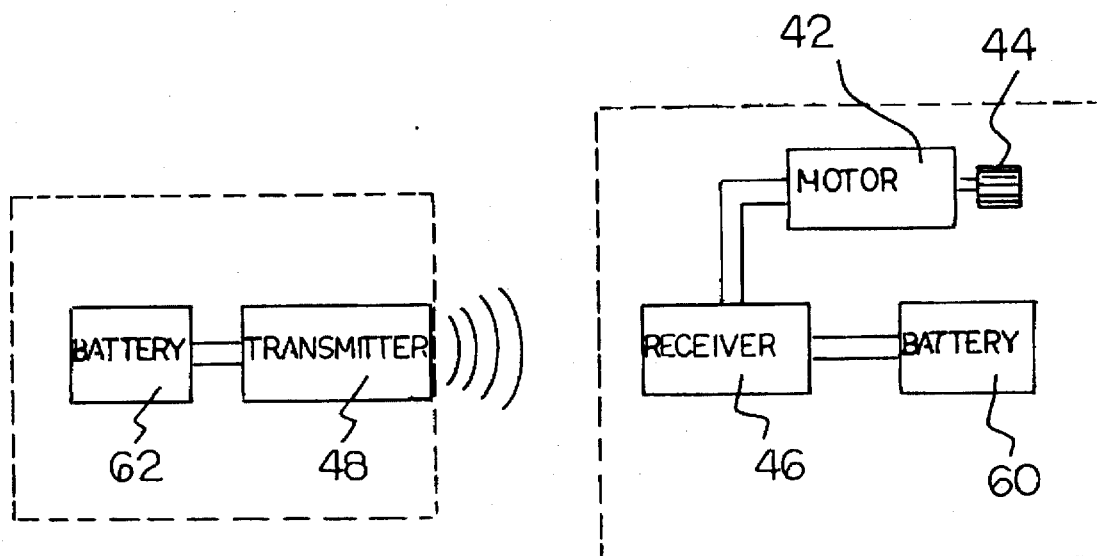
FIG. 6 is a schematic diagram of the rotating means.

As best illustrated in FIG. 2, it can be shown that the conical-shaped protective cover 20 comprises a triangular aperture 22 large enough to allow the projection of a pet's head. The conical-shaped protection cover includes a geared ring member 24 secured to the largest diameter end where the geared ring member 24 includes a rabbet 26 for engaging to the base member 30 as best shown in FIG. 4 of the drawings. The base member 30 includes a circular vertical bracket 32 which includes a flange 34 on the upper portion. The flange 34 rotatably engages the rabbet 26 of the geared ring member 24 as best shown in FIG. 4 of the drawings. A cross support member 36 engages an interior side of the circular vertical bracket 32 and projects engaging to the opposite interior side of the circular vertical bracket 32 as best shown in FIG. 3 of the drawings. A dish support plate 38 is secured to the central top portion of the cross support member 36 for supporting the feeding dish 50 as best shown in FIG. 4 of the drawings. The rotating means 40 includes a motor 42 as best shown in FIG. 4 of the drawings. A driver gear 44 is secured to the shaft of the motor 42 and rotatably engages the grooves of the geared ring member 24 as also shown in FIG. 4 of the drawings. A receiver 46 is electronically connected to the power source 60 and the motor 42. A transmitter 48 sends a signal which is detected by the receiver 46 at a predetermined distance as shown in FIG. 6 of the drawings. The transmitter 48 is electronically connected to a battery 62. The transmitter 48 is attached to a collar 14 where the collar 14 is positionable around a pet's neck 12 as best shown in FIG. 5 of the drawings. The conical-shaped protective cover 20 preferably includes a clear plastic window 28 as best shown in FIG. 1 of the drawings.

In use, the user fills the feeding dish 50 with the preferred amount of unlabeled food and places the feeding dish 50 on top of the dish support plate 38 within the conical-shaped protective cover 20. The present invention is placed in a position so the triangular aperture 22 is facing where animals can not enter. The pet carrying the transmitter 48 sees the unlabeled food through the clear plastic window 28 thereby positioning itself within the predetermined distance of the receiver 46 whereby the receiver 46 detects the signal from the transmitter 48. Upon detection of the signal, the receiver 46 engages the motor 42 which thereby rotates the conical-shaped protective cover 20 by rotating the driver gear 44 which engages the geared ring member 24. The conical-shaped protective cover 20 is rotated a finite distance so as to allow the triangular aperture 22 to face the pet 12 thereby allowing said pet 12 to project its head into the conical-shaped protective cover 20 to consume the unlabeled food from within. The transmitter 48 continuously transmits the signal to the receiver 46 retaining the conical-shaped protective cover 20 in the open position until the pet 12 is outside of the predetermined distance whereby the receiver activates the motor 42 to return the conical-shaped protective cover 20 back to its original position to keep undesired animals from consuming the unlabeled food.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An automatic animal feeding system comprising:
    a base member;
    a conical-shaped protective cover rotatably secured to the top of the base member;
    a feeding dish removably resting on the base member;
    a rotating means secured to the base member and mechanically engaging the conical-shaped protective cover where the rotating means protected by a water proof cover;
    a power source electronically connected to the rotating means, and
    an adjustable pet collar with transmitter attached thereto, whereby said transmitter sends a signal to activate said rotating means.

2. The automatic animal feeding system of claim 1, wherein the conical-shaped protective cover comprises a triangular aperture large enough to allow the projection of a pet's head.

3. The automatic animal feeding system of claim 2, wherein the conical-shaped protection cover includes a geared ring member secured to the largest diameter end where the geared ring member includes a rabbet for engaging to the base member.

4. The automatic animal feeding system of claim 3, wherein the base member includes:
    a circular vertical bracket which includes a flange on the upper portion, where the flange rotatably engages the rabbet of the geared ring member;
    a cross support member engaging an interior side of the circular vertical bracket and projects engaging to the opposite interior side of the circular vertical bracket; and
    a dish support plate secured to the central top portion of the cross support member for supporting the feeding dish.

5. The automatic animal feeding system of claim 4, wherein the rotating means includes:
    a motor;
    a driver gear secured to the shaft of the motor and rotatably engaging the grooves of the geared ring member;
    a receiver electronically connected to a power source and the motor; and
    said transmitter which sends a signal which is detected by the receiver at a predetermined distance, where the transmitter is electronically connected to a battery and where the transmitter is attached to a collar and where the collar is positionable around the pet's neck.

6. The automatic animal feeding system of claim 5, wherein the conical-shaped protective cover includes a clear plastic window.

* * * * *